United States Patent Office 3,641,158
Patented Feb. 8, 1972

3,641,158
PROCESS FOR THE PRODUCTION OF AROMATIC HYDROXYALDEHYDES
Adolph J. Deinet, Woodcliff Lake, and David X. Klein, Upper Montclair, N.J., assignors to Tenneco Chemicals, Inc.
No Drawing. Filed Mar. 10, 1969, Ser. No. 805,820
Int. Cl. C07c 47/56
U.S. Cl. 260—600  4 Claims

ABSTRACT OF THE DISCLOSURE

Salicylaldehyde and other hydroxybenzaldehydes are prepared by heating an ester having the structural formula

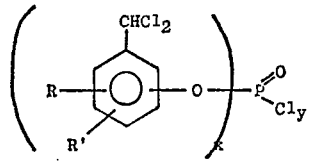

wherein R and R' are each hydrogen, chlorine, bromine, lower alkyl, or lower alkoxy; $x$ and $y$ are each 1 or 2; and the sum of $x$ and $y$ is 3 with water at a temperature at which the ester is hydrolyzed and the aldehyde is simultaneously steam-distilled from the reaction mixture.

---

This invention relates to a process for the production of aromatic hydroxyaldehydes. More particularly, it relates to a process for the production of salicylaldehyde and other hydroxybenzaldehydes by the hydrolysis of a chlorinated cresol ester.

It is known that salicylaldehyde can be prepared by the hydrolysis of tri-($\alpha,\alpha$-dichloro-o-cresyl) phosphate and di-($\alpha,\alpha$-dichloro-o-cresyl) carbonate. For example, the hydrolysis of these chlorinated cresyl esters may be effected in alcohol solution with strong alkali, such as sodium hydroxide. Such a process is not satisfactory for commercial use because it requires the recovery of large amounts of alcohol and the use of at least six moles of sodium hydroxide per mole of the ester. Moreover, this alkaline hydrolysis procedure yields salicylaldehyde in the form of a solution of its sodium salt. Acidification of the solution to liberate the aldehyde, extraction of the aldehyde from the solution, and recovery of the aldehyde are necessary before a pure product is obtained. Another process that has been proposed for the production of salicylaldehyde calls for the hydrolysis of tri-($\alpha,\alpha$-dichloro-o-cresyl) phosphate and other esters of o-cresol using steam at elevated temperatures. In this procedure there is a prolonged induction period during which the hydrolysis proceeds slowly, and a lengthy heating period is required if complete hydrolysis of the ester is to be achieved. During this hydrolysis, appreciable amounts of o-chlorotoluene, tars, and other by-products of the reaction are formed.

In accordance with this invention, it has been found that salicylaldehyde and other hydroxybenzaldehydes can be rapidly and efficiently prepared by the hydrolysis with water of P-chloro-($\alpha,\alpha$-dichlorocresyl) phosphates.

The chlorinated cresyl esters that can be hydrolyzed by the process of this invention to form salicylaldehyde and other hydroxybenzaldehydes have the structural formula

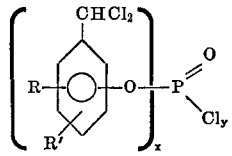

wherein R and R' are each hydrogen, chlorine, bromine, lower alkyl, or lower alkoxy; $x$ and $y$ are each 1 or 2; and the sum of $x$ and $y$ is 3. The process is of particular value in the production of salicylaldehyde by the hydrolysis of P - chloro - di - ($\alpha,\alpha$ - dichloro-o-cresyl) phosphate, which has the structural formula

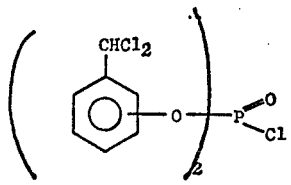

Unlike the previously-used chlorinated cresyl esters, such as tri-($\alpha,\alpha$-dichloro-o-cresyl) phosphate, which are resistant to hydrolysis even when treated with superheated steam, the P - chloro-($\alpha,\alpha$-dichlorocresyl) phosphates undergo rapid hydrolysis even with water at relatively low temperatures (80°–100° C.). Because of their more rapid rate of hydrolysis, greater productivity can be obtained when the P-chloro-($\alpha,\alpha$-dichlorocresyl) phosphates are used than is possible using other cresyl esters. In addition the P-chloro-($\alpha,\alpha$-dichlorocresyl) phosphates are mobile liquids that can be handled and stored more easily than tri-($\alpha,\alpha$-dichloro-o-cresyl) phosphate, which is solid at room temperature.

In a preferred embodiment of the invention, salicylaldehyde is produced by hydrolyzing P-chloro-di-($\alpha,\alpha$-dichloro-o-cresyl) phosphate under such conditions that the aldehyde is steam-distilled away from the hydrolysis mixture as soon as it is formed.

The chlorinated cresyl ester that is subjected to hydrolysis may be prepared by any suitable and convenient procedure. For example, o-cresol may be heated with phosphorus oxychloride in the presence of a catalyst, such as magnesium oxide, to form P-chloro-di-o-cresyl phosphate. This ester may be chlorinated by contacting it with chlorine at a temperature in the range of about 180° to 220° C., and preferably 190° to 195° C., until the amount of chlorine necessary to produce the $\alpha,\alpha$-dichloro derivative has been absorbed. The resulting crude chlorinated ester, which contains in addition to the $\alpha,\alpha$-dichloro compound small amounts of the $\alpha$-monochloro and the $\alpha,\alpha,\alpha$-trichloro compounds, may be used without purification in the hydrolysis reaction. The crude chlorinated ester is heated with water at a temperature at which the ester is hydrolyzed and the salicylaldehyde formed is simultaneously steam-distilled from the hydrolysis mixture. Fractional distillation of the distillate yields salicylaldehyde of at least 99.5 percent purity.

In the hydrolysis step of this process, P-chloro-di-($\alpha,\alpha$-dichloro-o-cresyl) phosphate is heated with at least twice its weight of water. When less than this amount of water is used, the hydrolysis mixture tends to foam, and it is often thick and difficult to stir. In addition this amount of water is necessary to dissolve the evolved hydrogen chloride and form a constant-boiling solution, thereby preventing the loss of gaseous hydrogen chloride to the atmosphere. A water:chlorinated ester ratio of 4:1 or more can be used, but there is no particular advantage resulting from the use of these larger amounts of water. Particularly satisfactory results are obtained when about three parts by weight of water is used per part by weight of chlorinated ester in the hydrolysis mixture.

The hydrolysis of the chlorinated ester takes place rapidly at temperatures in the range of about 80° to 110° C. When it is desired that the salicylaldehyde be steam-distilled from the hydrolysis mixture as soon as it is formed, the hydrolysis is carried out at the reflux temperature of the chlorinated ester-water mixture (about 100°–110° C.). There is no induction period, and hydrolysis of the ester proceeds very rapidly. Steam-distillation of salicylaldehyde from the hydrolysis vessel starts at once and continues until the hydrolysis of the chlorinated ester has been completed.

If desired, the hydrolysis and steam distillation may be carried out at 110° to 150° C. In most cases, however, it is more convenient to carry out these steps at the reflux temperature of the mixture. While the hydrolysis of P-chloro-di-($\alpha,\alpha$-dichloro-o-cresyl) phosphate will occur at temperatures as low as 25° C., the hydrolysis does not proceed rapidly at temperatures below about 80° C. When temperatures below about 100° C. are used for the hydrolysis, the aldehyde may be separated from the hydrolysis mixture by extraction or by other known techniques.

The process as described is also applicable to the preparation of salicylaldehydes that are substituted on the aromatic nucleus with one or two substituents, such as halogen, lower alkyl, or lower alkoxy, as well as to the preparation of p-hydroxybenzaldehyde and substituted p-hydroxybenzaldehydes. For example, by this process 5-methyl-salicylaldehyde, 3-tert. butyl-5-methylsaliscylaldehyde, 3-chlorosalicylaldehyde and 3-methoxysalicylaldehyde may be obtained by the hydrolysis of the corresponding P-chloro-($\alpha,\alpha$-dichloro-substituted-o-cresyl) phosphates, and p-hydroxybenzaldehyde and substituted p-hydroxybenzaldehydes may be obtained by the hydrolysis of the corresponding P-chloro-($\alpha,\alpha$-dichloro-p-cresyl) phosphates.

The invention is further illustrated by the example that follows. In this exampe all parts are parts by weight and all percentages are percentages by weight.

EXAMPLE 1

A mixture of 432 parts (4.00 moles) of o-cresol, 306 parts (2.00 moles) of phosphorus oxychloride, and 0.22 part of magnesium oxide was heated to 110° C. over a period of one hour and then from 110° C. to 180° C. over a period of three hours. It was maintained at 180° C. for three hours.

The reaction mixture was heated to 190°–195° C. and maintained at that temperature while chlorine was bubbled through it. The chlorination was continued until the weight increase indicated that P-chloro-di-($\alpha,\alpha$-dichloro-o-cresyl) phosphate had been formed. When cooled to room temperature this ester was a mobile, clear, amber-colored oil.

Twenty-six hundred parts of water and 870 parts of P-chloro-di-($\alpha,\alpha$-dichloro-o-cresyl) phosphate were placed in a flask that was equipped with an agitator, a Dean-Stark water trap, and a condenser. The reaction mixture was heated to its boiling point (107° C.), and the steam-distillation of salicylaldehyde from the flask began at once. After about 3 hours the hydrolysis was complete, and 355 parts of crude salicylaldehyde had been collected. This crude salicylaldehyde was distilled through a fractionating column, and 300 parts of substantially pure (>99.5%) salicylaldehyde was obtained.

Each of the other P-chloro-di-($\alpha,\alpha$-dichloro-substituted cresyl) phosphates hereinbefore mentioned can be hydrolyzed in a similar way to the corresponding substituted salicylaldehyde, p-hydroxybenzaldehyde, or substituted p-hydroxybenzaldehyde.

The terms and expressions that have been used are used as terms of description and not of limitations. There is no intention in the use of such terms and expressions of excluding any equivalents of the features shown and described or portions thereof. It is recognized that various modifications are possible within the scope of the invention claimed.

What is claimed is:

1. The process for the production of salicylaldehyde which comprises contacting p-chloro-di-($\alpha,\alpha$-dichloro-o-cresyl) phosphate with at least twice its weight of water at a temperature in the range of about 25° C. to 150° C.

2. The process for the production of salicylaldehyde which comprises (a) forming a hydrolysis mixture containing P-chloro-di-($\alpha,\alpha$-dichloro-o-cresyl) phosphate and water in the amounts of 2 parts to 4 parts by weight of water per part by weight of said phosphate and (b) heating said hydrolysis mixture at a temperature in the range of 100° C. to 150° C. thereby hydrolyzing said phosphate to salicylaldehyde and simultaneously steam-distilling the salicylaldehyde formed from the hydrolysis mixture.

3. The process of claim 2 wherein the hydrolysis mixture contains about 3 parts by weight of water per part by weight of said phosphate.

4. The process of claim 2 wherein the hydrolysis mixture is heated at its reflux temperature to simultaneously hydrolyze the phosphate and steam distill the salicylaldehyde formed from the hydrolysis mixture.

References Cited

UNITED STATES PATENTS

| 1,023,758 | 4/1912 | Raschig et al. | 260—600 |
| 3,314,998 | 4/1967 | Levy et al. | 260—600 |

BERNARD HELFIN, Primary Examiner

U.S. Cl. X.R.

260—975